United States Patent [19]
Kenmochi

[11] Patent Number: 5,953,391
[45] Date of Patent: Sep. 14, 1999

[54] DATA COMMUNICATION APPARATUS HAVING AUTOMATIC DATA RECEPTION INFORMING SYSTEMS

[75] Inventor: Toshio Kenmochi, Yokohama, Japan

[73] Assignee: Canon Kabushiki Kaisha, Tokyo, Japan

[21] Appl. No.: 08/138,627

[22] Filed: Oct. 19, 1993

Related U.S. Application Data

[63] Continuation of application No. 07/751,649, Aug. 26, 1991, abandoned, which is a continuation of application No. 07/444,309, Dec. 1, 1989, abandoned.

[30] Foreign Application Priority Data

| Dec. 5, 1988 | [JP] | Japan | 63-305993 |
| Dec. 5, 1988 | [JP] | Japan | 63-307310 |
| Dec. 7, 1988 | [JP] | Japan | 63-307887 |
| Jan. 11, 1989 | [JP] | Japan | 1-4460 |

[51] Int. Cl.$^6$ ..................................... H04M 1/64
[52] U.S. Cl. ................. 379/77; 379/80; 379/88.23; 379/88.27; 379/100.01; 379/102.01
[58] Field of Search ................. 379/67, 69, 70, 379/74, 77, 80, 88, 96, 100, 102, 104, 88.23, 88.24, 88.25, 88.26, 88.27, 88.28; 358/402–404, 444

[56] References Cited

U.S. PATENT DOCUMENTS

| 4,072,824 | 2/1978 | Phillips | 379/70 |
| 4,106,060 | 8/1978 | Chapman, Jr. | 379/100 |
| 4,160,125 | 7/1979 | Bower et al. | 379/69 |
| 4,172,969 | 10/1979 | Levine et al. | 379/70 |
| 4,304,968 | 12/1981 | Klausner et al. | 379/70 |
| 4,331,983 | 5/1982 | Burton et al. | 379/100 |
| 4,340,783 | 7/1982 | Sugiyama et al. | 379/100 |
| 4,536,617 | 8/1985 | Perry | 179/81 |
| 4,602,129 | 7/1986 | Matthews et al. | 379/67 |
| 4,785,355 | 11/1988 | Matsumoto | 358/257 |
| 4,794,637 | 12/1988 | Hashimoto | 379/67 |
| 4,814,890 | 3/1989 | Kato | 358/280 |
| 4,837,797 | 6/1989 | Freeny, Jr. | 379/67 |
| 4,847,891 | 7/1989 | Kotani | 379/88 |
| 4,873,713 | 10/1989 | Yamanouchi et al. | 379/69 |
| 4,900,902 | 2/1990 | Sakakibara | 235/375 |
| 4,907,094 | 3/1990 | Mishima et al. | 357/437 |
| 4,994,926 | 2/1991 | Gordon et al. | 358/407 |
| 5,008,926 | 4/1991 | Misholi | 379/89 |

FOREIGN PATENT DOCUMENTS

| 3234081 | 3/1984 | Germany . |
| 3507479 | 4/1986 | Germany . |
| 131158 | 8/1982 | Japan . |
| 002461 | 1/1988 | Japan . |

*Primary Examiner*—Fan S. Tsang
*Attorney, Agent, or Firm*—Fitzpatrick, Cella, Harper & Scinto

[57] ABSTRACT

A data communication apparatus includes a receiving unit for receiving data, a memory unit for storing received data, an informing unit for, after memory reception is performed by the memory unit, automatically calling a predetermined destination and informing that memory reception is performed, and a transmitting unit for transmitting data of the memory unit in accordance with reception of a control signal.

33 Claims, 8 Drawing Sheets

| MESSAGE | CODE |
|---|---|
| 0 | 0 |
| 1 | 1 |
| 2 | 2 |
| 3 | 3 |
| 4 | 4 |
| 5 | 5 |
| 6 | 6 |
| 7 | 7 |

| MESSAGE | CODE |
|---|---|
| 8 | 8 |
| 9 | 9 |
| -(HYPHEN) | *2 |
| ((LEFT BRACKET) | *4 |
| )(RIGHT BRACKET) | *6 |
| SPACE(BLANK) | *8 |
| MESSAGE INPUT ENDING SYMBOL | ## |
| MESSAGE CORRECT SYMBOL | ** |

FIG. 4

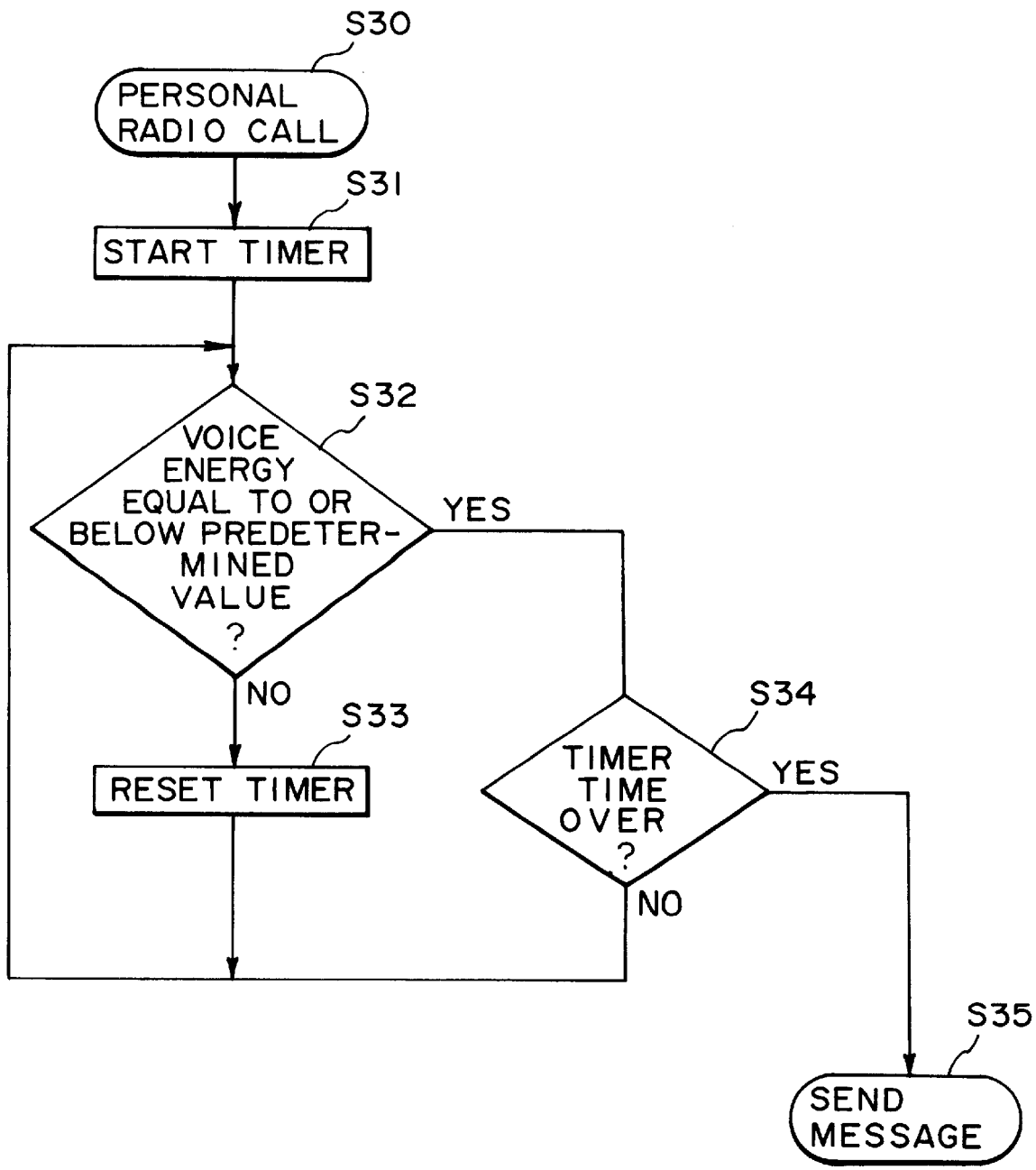
F I G. 7

DATA COMMUNICATION APPARATUS HAVING AUTOMATIC DATA RECEPTION INFORMING SYSTEMS

This application is a continuation, of application Ser. No. 07/751,649 filed on Aug. 26, 1991, now abandoned, which is a continuation of application Ser. No. 07/444,309 filed on Dec. 1, 1989, now abandoned.

BACKGROUND OF THE INVENTION

1. Field of the Invention

The present invention relates to a data communication apparatus and, more particularly, to a data communication apparatus having a data memory for storing received data.

2. Related Background Art

In an environment such as an office, unlike a telephone set, a facsimile apparatus, for example, is rarely installed for each user but often installed in a place remote from a desk or the like of a user as a data transmitting/receiving operator.

Therefore, in order to perform facsimile transmission/reception, a user must move to the apparatus to place an original or perform other necessary operations.

In consideration of the above situation, a conventional apparatus which informs, e.g., an image transmission/reception result (presence/absence of communication) to a predetermined telephone set by a voice has been proposed.

In such a conventional apparatus, however, since only the communication result is informed, a user must move to the apparatus and collect an original or a received image.

In addition, in a conventional apparatus of this type, a communication result is informed only once. Therefore, if a user misses reception of this information, he or she cannot know a communication state.

Furthermore, in the conventional apparatus, a message for informing data reception is the same regardless of the number of times of reception. Therefore, if a plurality of image data are memory-received, a plurality of communications cannot be identified.

In the apparatus for performing memory reception as described above, if information indicating data reception is given to a user and no response is obtained from the user, received image information remains in a memory to cause an overflow of the memory, thereby disabling further memory reception.

In the case of automatically sending a message informing data reception as described above, if a message transmission destination outputs a message by automatic response, a message sent from a transmission source collides with a message sent from the transmission destination. As a result, the message cannot be correctly sent to the destination. Prior applications associated with such memory reception are U.S. patent application Ser. No. 942,208 (Dec. 16, 1986), now U.S. Pat. No. 4,900,902, issued Feb. 13, 1990 U.S. Pat. No. 4,785,355, U.S. patent application Ser. No. 114,519 (Oct. 30, 1987), U.S. patent application Ser. No. 120,104 (Nov. 13, 1987), U.S. Pat. No. 4,814,890, U.S. patent application Ser. No. 147,224 (Jan. 22, 1988), now U.S. Pat. No. 4,907,094, issued Mar. 6, 1990 U.S. patent application Ser. No. 244,305 (Sep. 15, 1988), and U.S. patent application Ser. No. 282,684 (Dec. 12, 1988).

SUMMARY OF THE INVENTION

The present invention has been made in consideration of the above situation and intends as its object to improve a data communication apparatus.

It is another object of the present invention to provide a data communication apparatus capable of performing remote control from a remote location.

It is still another object of the present invention to provide a data communication apparatus capable of sending a message indicating data reception to a remote location when data is memory-received, and transmitting the memory-received data by remote control from the remote location.

It is still another object of the present invention to provide a data communication apparatus capable of, when a plurality of data are memory-received, transmitting information for identifying data in a memory to a remote location, and selecting and remote-transmitting arbitrary data from the memory by remote control from the remote location.

It is still another object of the present invention to provide a data communication apparatus capable of correctly processing memory-received data and preventing an overflow of a memory.

It is still another object of the present invention to provide a data communication apparatus capable of correctly sending a message to a remote location.

The other objects will become apparent from the detailed description of embodiments of the present invention and the accompanying drawings.

BRIEF DESCRIPTION OF THE DRAWINGS

FIG. 4 is a view showing a relationship between a message code and a DTMF signal code of a personal radio;

FIG. 7 is a flow chart for explaining a control operation of a personal radio according to the third embodiment.

DETAILED DESCRIPTION OF THE PREFERRED EMBODIMENTS

Preferred embodiments of the present invention will be described in detail below with reference to the accompanying drawings.

The following embodiments will be described by taking a facsimile apparatus as an example of a data communication apparatus. The present invention, however, is not limited to the facsimile apparatus but can be applied to any data communication apparatus having a function of memory-receiving data.

Figure 1:
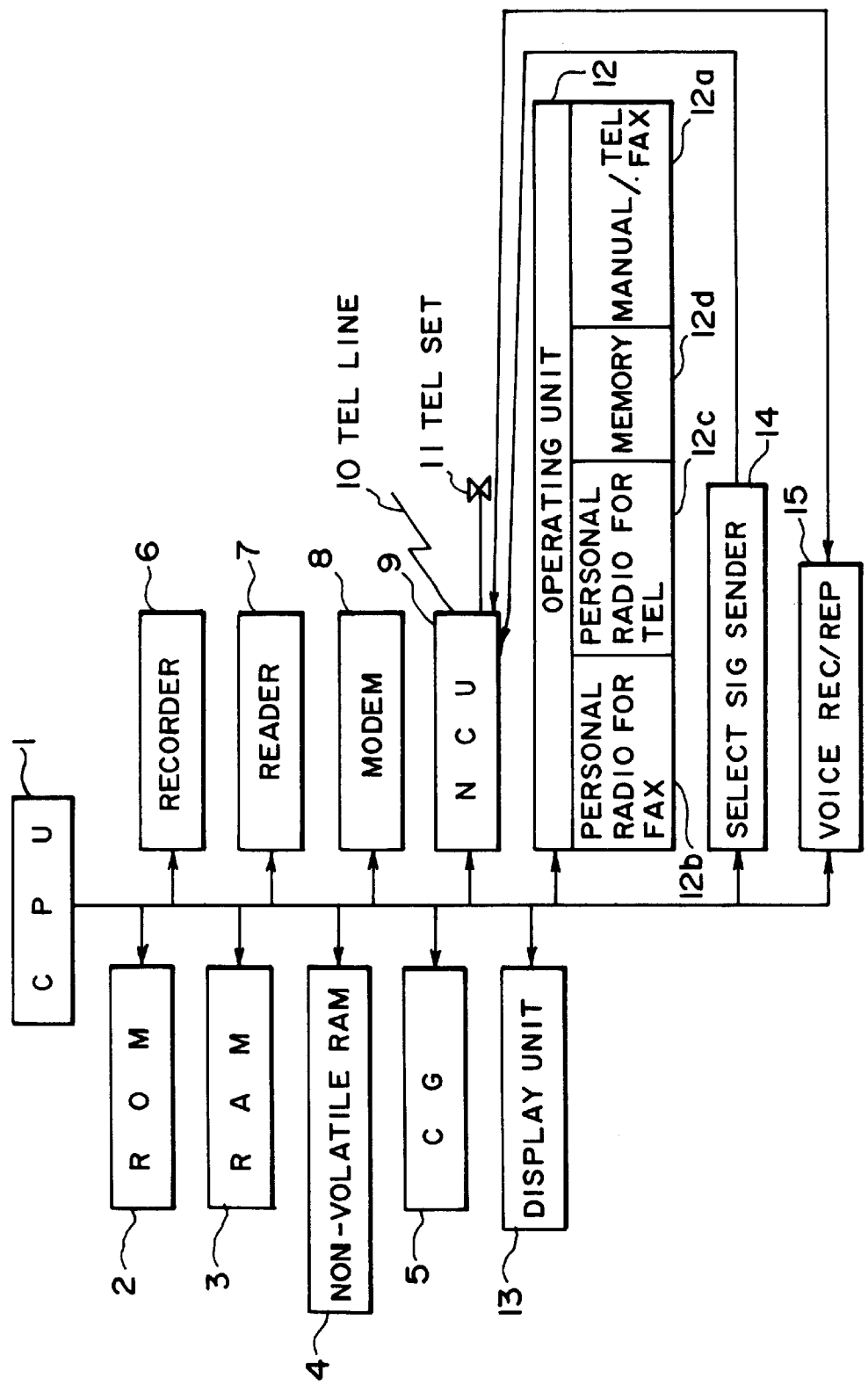
FIG. 1 is a block diagram showing an arrangement of a facsimile apparatus according to the first embodiment.

FIG. 1 is a block diagram showing an arrangement of a facsimile apparatus according to the first embodiment of the present invention.

A CPU 1 controls the overall facsimile apparatus, i.e., a RAM 3, a non-volatile RAM 4, a character generator (CG) 5, a recorder 6, a reader 7, a modem 8, a network control unit (NCU) 9, an operating unit 12, a display unit 13, a select signal sender 14, and a voice recording/reproducing unit 15, in accordance with programs stored in a ROM 2. The respective units will be described below.

The RAM 3 stores binary image data read by the reader 7 or binary image data recorded by the recorder 6, and stores binary image data obtained by modulating a signal by the modem 8 and to be output to a telephone line 10 via the NCU 9. The RAM 3 also stores binary data obtained by demodulating an analog waveform input from the telephone line 10 via the NCU 9 and the modem 8.

The non-volatile RAM 4 is constituted by, e.g., an EEPROM and can reliably store data to be stored even if a power source of the facsimile apparatus is cut off. The non-volatile RAM 4 is also used as registering means for registering destination names and telephone numbers in a one-to-one correspondence via the operating unit 12.

The CPU 1 has a function as transmitting means for transmitting a destination name corresponding to an input destination telephone number to a destination receiver on the basis of the programs stored in the ROM 2.

The CG 5 is a ROM for storing characters such as a JIS code and an ASCII code. Under the control of the CPU 1, the CG 5 extracts character data corresponding to a predetermined code by 2-byte data as needed.

The recorder 6 is constituted by, e.g., a DMA controller, a sub CPU, an A5-size thermal head, and a TTL (transistor-transistor logic) IC. Under the control of the CPU 1, the recorder 6 reads out recorded data stored in the RAM 3 and prints out the data as a hard copy.

The reader 7 is constituted by, e.g., a DMA controller, a sub CPU, a CCD, a TTL IC, and an A4/A5 sensor. The reader 7 digitizes data read by using the CCD and sequentially sends the binary data to the RAM 3.

The modem 8 is constituted by, e.g., G3, G2, G1, and FM modems, a clock generator, and a voice/DTMF detector. Under the control of the CPU 1, the modem 8 modulates transmission data stored in the RAM 3 and outputs the data to the telephone line 10 via the NCU 9. The modem 8 also receives an analog signal from the telephone line 10 via the NCU 9, demodulates the signal into binary data, and stores the binary data in the RAM 3.

The NCU 9 switches the telephone line to either the modem 8 or a telephone set 11 under the control of the CPU 1.

The operating unit 12 is constituted by, e.g., a key for starting transmission/reception and the like, a mode select key for designating an operation mode such as a fine, standard, or auto reception mode upon transmission/reception, and ten keys. Note that the CPU 1 detects depression states of these keys and controls the respective units in accordance with the detected states.

In this embodiment, the operating unit 12 also includes a manual/TEL (telephone)-FAX (facsimile) mode switch 12a, a personal radio call (or pocket bell call) switch 12b for a facsimile, a personal radio call switch 12c for a telephone, and a memory reception switch 12d.

The manual/TEL-FAX switch 12a is used to perform switching between manual transmission/reception and automatic transmission/reception (TEL-FAX mode). In the TEL-FAX mode, the manual/TEL-FAX switch 12a is used to automatically determine voice communication or facsimile communication upon automatic reception and to select an adequate communication scheme by a toggle operation or the like. The two personal radio call switches 12b and 12c for a telephone and a facsimile are used to determine whether a telephone number of a predetermined personal radio receiver (or a predetermined pocket bell receiver) is called in order to inform that data is received by a facsimile.

The memory reception switch 12d is used to determine whether memory reception is to be performed in facsimile communication, i.e., whether a received image is to be stored in a memory or sequentially output.

The display unit 13 is a liquid crystal display for performing a 16-digit display and displays predetermined characters and the like under the control of the CPU 1.

Under the control of the CPU 1, the select signal sender 14 sends select signals such as a pulse dialer and a tone dialer via the NCU 9.

The voice recording/reproducing unit 15 records/reproduces an analog signal on the telephone line via the NCU 9 under the control of the CPU 1. In this case, the analog signal on the telephone line is, e.g., a voice message from a destination station, and this analog data can be digital-recorded in the RAM 3. When no digital recording is used, a medium such as a magnetic tape may be used.

In this embodiment, upon data reception, telephone or facsimile communication is automatically switched, and an exclusive personal radio receiver is paged and informed of the data reception in accordance with set states of the FAX personal radio call switch 12b and the TEL call switch 12c. Especially when the memory reception mode is set by the memory reception switch 12d in facsimile reception, a user externally calls the apparatus to transmit a predetermined DTMF code, thereby transferring image data stored in the memory to a destination station. Note that in the following description, this transfer processing is executed in only the telephone and facsimile communication automatic switching mode.

A control sequence for performing the above operation upon automatic reception will be described in detail below with reference to a flow chart shown in FIG. 2. This sequence is stored in the ROM 2 as a program of the CPU 1 and is started upon a predetermined operation designating reception at the operating unit 12 or upon reception of a call signal via the telephone line 10.

Figure 2A:
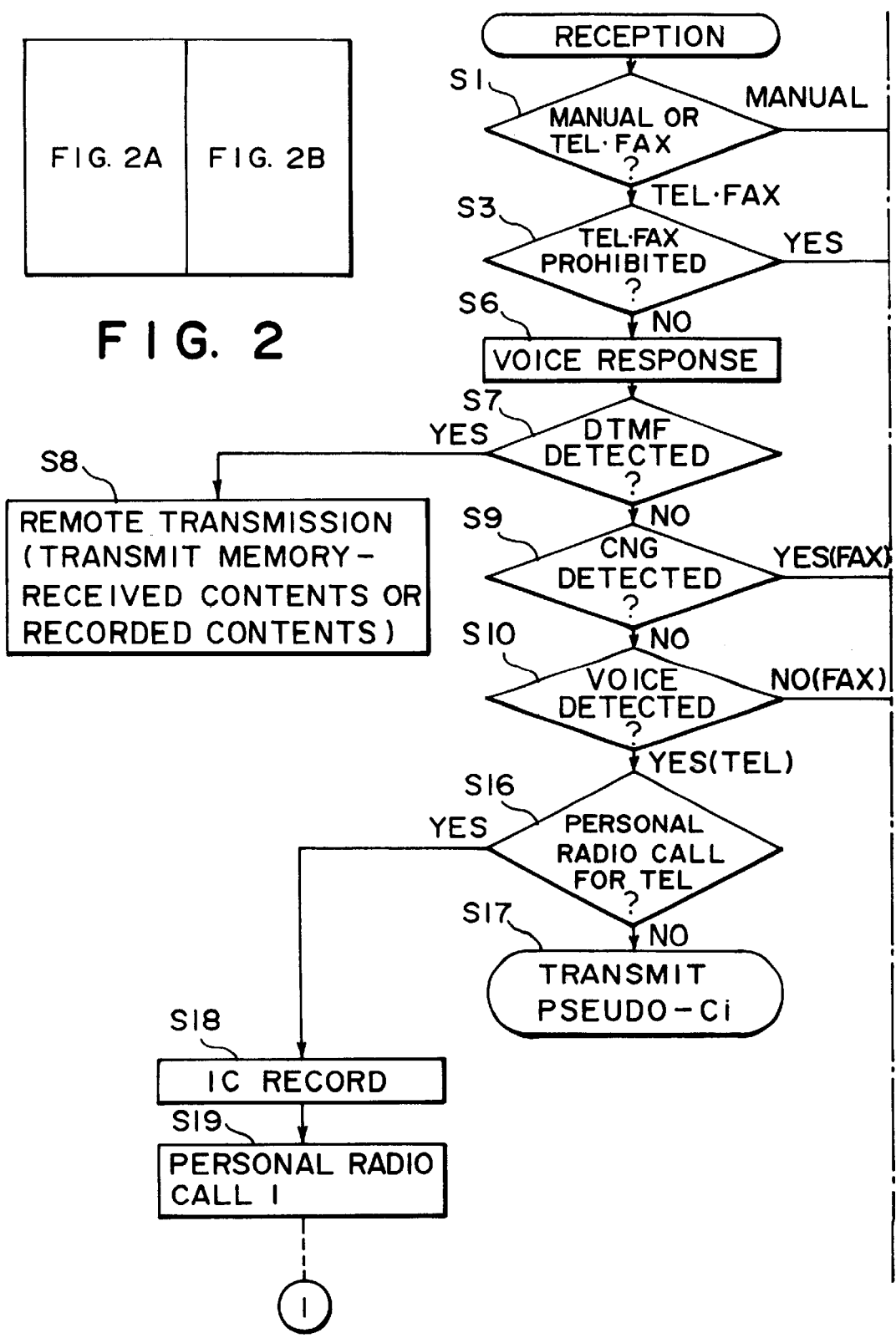
FIG. 2 combined by FIGS. 2A and 2B is a flow chart for explaining a control operation upon data reception of the first embodiment.
Figure 2B:
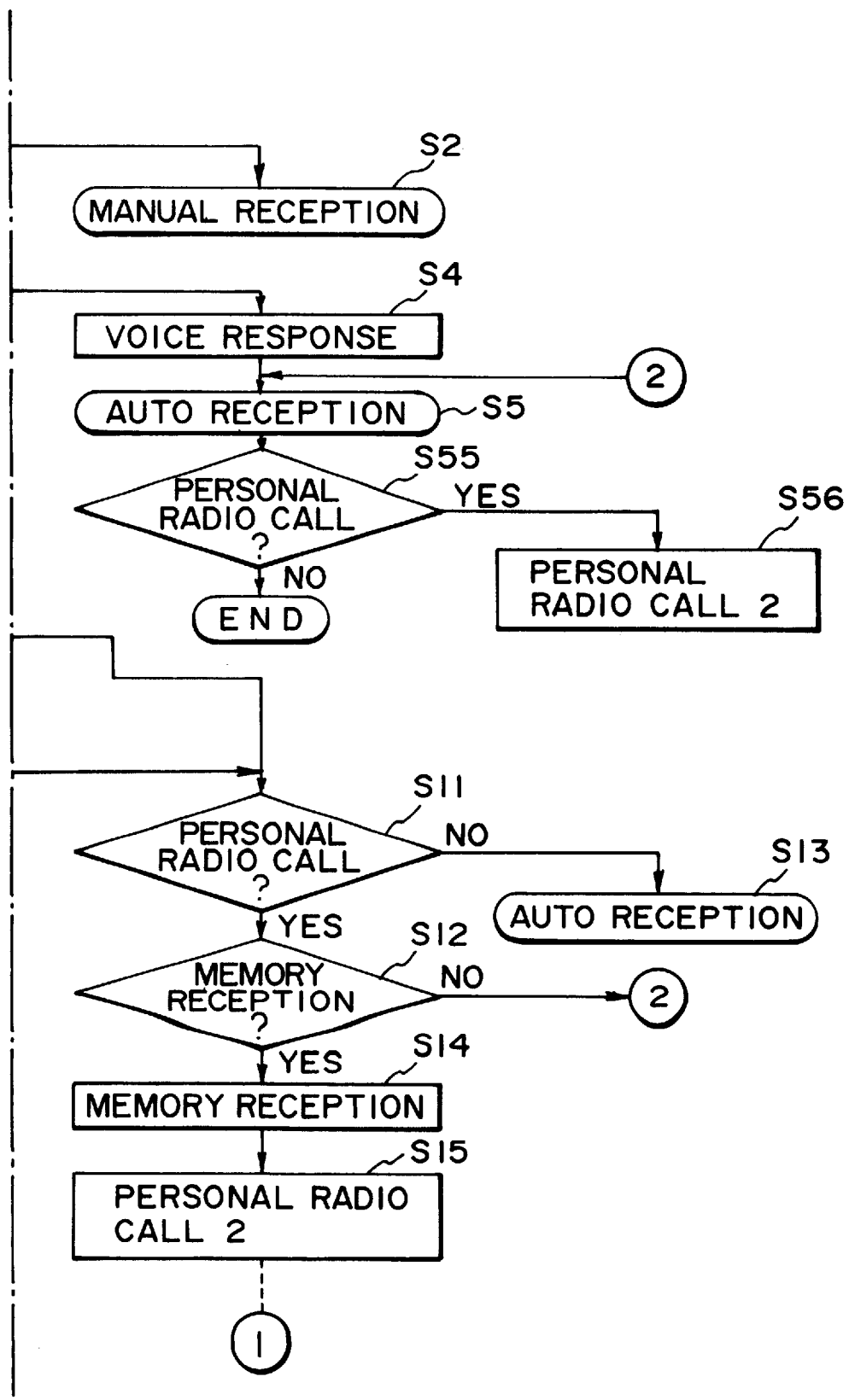

Referring to FIG. 2, in step S1, the state of the manual/TEL-FAX switch 12a on the operating unit 12 is checked.

If the manual mode is determined in step S1, the same operation as conventional facsimile reception is performed in step S2. If the TEL-FAX mode is determined in step S1, the set state of a software switch stored in the non-volatile RAM 4 and representing whether the TEL-FAX mode is to be executed or prohibited is checked in step S3. This software switch is performed by a predetermined operation on the operating unit 12 (or automatic setting during communication control) as in a conventional apparatus.

If it is determined in step S3 that the TEL-FAX mode is prohibited, i.e., facsimile and telephone communication automatic switching upon data reception is prohibited, the flow advances to step S4. In step S4, the voice recording/reproducing unit 15 is used to send a voice message such as "a line is connected to a facsimile", thereby performing a voice response. The flow then advances to facsimile automatic reception in step S5. That is, when the TEL-FAX mode is prohibited, facsimile automatic reception has priority.

When the conventional automatic reception processing is finished, an operation state of the FAX personal radio call switch 12b is checked in step S56 to check whether a personal radio call is to be performed. If the FAX personal radio call switch 12b is set to perform a TEL personal radio call, the select signal sender 14 is used to call a telephone number of a personal radio register beforehand in the non-volatile RAM 4, in step S56. In this case, a personal radio call in a mode 2 is performed so as to be distinguished from an operation of informing a telephone call to be described later. As a result, a network for performing a personal radio service is called and a personal radio call is performed by this service network. At a personal radio receiver, a difference in call mode can be distinguished by a sound pattern of the radio or a code display on a display unit. If the FAX personal radio call switch 12b is not set to perform the personal radio call in step S55, the processing is immediately ended. Note that registration of telephone numbers in the non-volatile RAM 4 is performed beforehand by a known sequence.

If the TEL/FAX mode is not prohibited in step S3, in step S6, a voice message for telephone/facsimile automatic switching such as "If you have a facsimile, please depress the start button. If you have a telephone set, please say hello." is output to the telephone line 10 by using the voice recording/reproducing unit 15.

In steps S7, S9, and S10, a DTMF signal for remote control, a CNG signal indicating a non-voice terminal, and a voice signal are detected, respectively.

If a user is trying to transfer received image data in the RAM 3 from an external facsimile apparatus in response to the personal radio call in step S56, a DTMF signal is transmitted from the facsimile apparatus. Therefore, if a predetermined DTMF signal (in this case, a DTMF signal corresponding to "*" and "1" keys of dial keys) is detected in step S7, the flow advances to remote transmission in step S8. In step S8, a polling mode is started, and received data in the RAM 3 received in step S14 is transferred.

If another DTMF signal (e.g., a DTMF signal corresponding to "*" and "2" keys of the dial keys) is received in step S7, the flow similarly advances to step S8. In this case, however, a voice message automatically recorded by the voice recording/reproducing unit 15 is transmitted to the destination station. In this case, the destination station is a terminal capable of at least voice reception, e.g., a telephone set.

If a CNG signal is received in step S9, in step S11, it is checked in accordance with the operation state of the FAX call switch 12b whether the personal radio call is to be performed. If the personal radio call is not determined, normal automatic reception is performed in step S13.

If the personal radio call is determined, the flow advances to step S12 to check in accordance with the operation state of the memory reception switch 12d whether memory reception is to be performed. If memory reception is not determined, the flow advances to step S5. If memory reception is determined to be performed in step S12, the image data received in step S14 is stored in the RAM 3.

Thereafter, in step S15, the select signal sender 14 is used to perform the personal radio call in the mode 2 in order to inform facsimile reception.

If a voice is detected in step S10, the flow advances to step S16 to check the operation state of the TEL call switch 12c. If the TEL personal radio call is determined, the flow advances to step S18, and a voice signal from the destination station is recorded by the voice recording/reproducing unit 15. In step S19, the personal radio call is performed by the select signal sender 14. In this case, the call is performed in a mode 1 in order to inform voice message reception.

If the personal radio call is not determined, in step S17, an internal ringer circuit of the NCU 9 is used to generate a pseudo ringing tone from the telephone set 11 to call a user. If the user picks up a hook of the telephone set 11 and answers the call, a communication is performed between the user and the destination station.

As described above, according to the first embodiment, the apparatus is interlocked with the personal radio receiver. Therefore, in the telephone-facsimile automatic switching mode, incoming calls from a telephone and a facsimile can be distinguished from each other upon paging the personal radio receiver.

By using the personal radio receiver, a user can monitor the state of the facsimile apparatus from any place.

In this case, if the memory reception mode is set, memory-received image data can be transferred to another facsimile by designating a DTMF signal. Therefore, a user need not move to the apparatus but can rapidly obtain the received image data even in a remote location such as a visiting destination. In addition, an automatically recorded voice message can be remote-transmitted.

The number of personal radio calls performed to inform a communication result has not been described in detail above. In accordance with a sequence as shown in FIG. 3, however, the personal radio calls can be repeated until a response is obtained.

Figure 3:
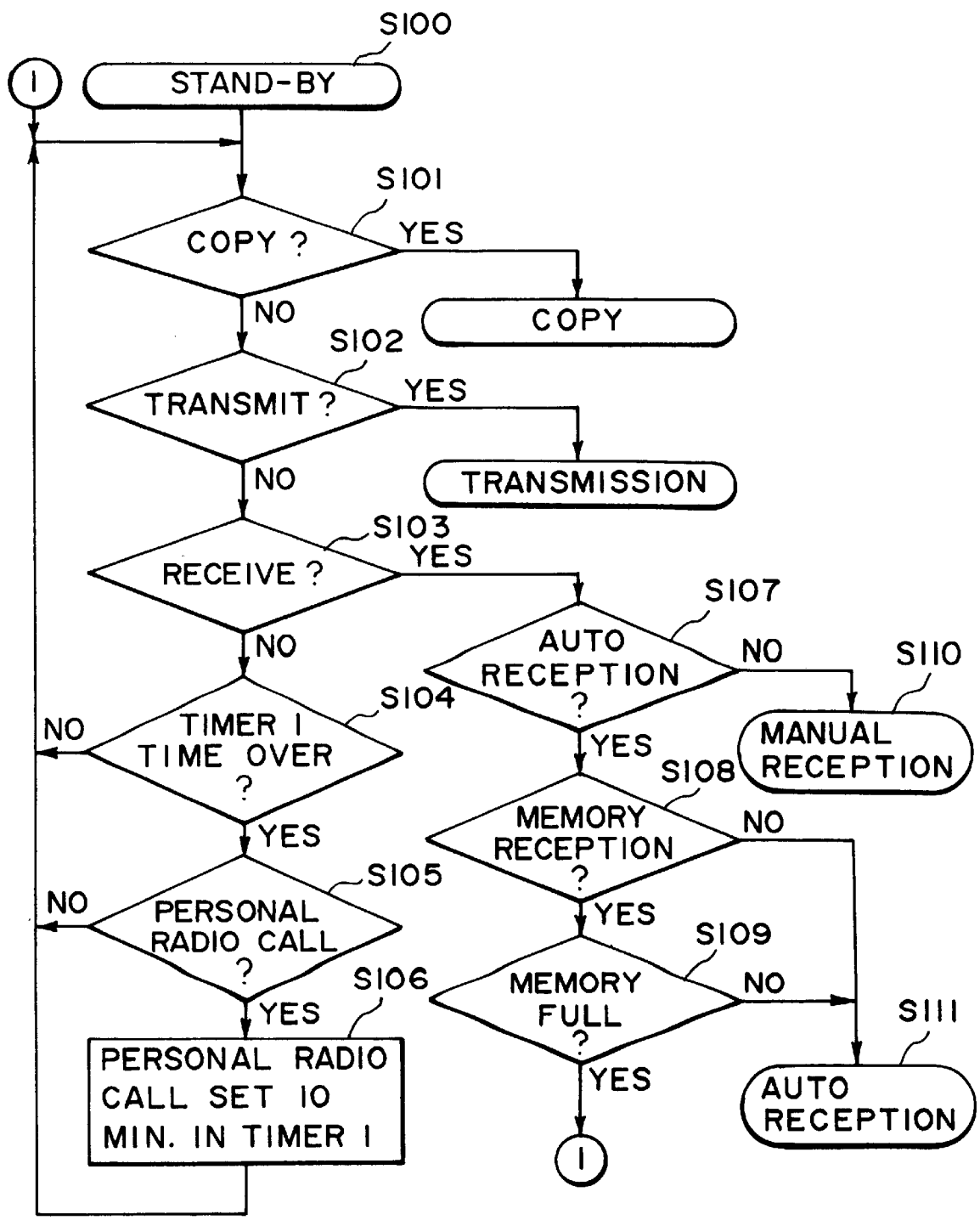
FIG. 3 is a flow chart for explaining a control operation in the stand-by mode.

The sequence shown in FIG. 3 is performed after step S15 or S19 in the flow chart shown in FIG. 2. In this case, a timer circuit (constituted by hardware or software of the CPU 1) is used.

After the personal radio call is performed in step S15 or S19 in FIG. 2, a count time of 10 minutes is set in the timer circuit, and the flow returns to a stand-by state in step S100.

In the stand-by state, copy, transmission, and reception are checked in steps S101, S102, and S103, respectively. If none of these states is determined, it is checked in step S104 whether the timer circuit is time over. If time over is not determined, the flow returns to step S101. If reception is detected in step S103, automatic reception, memory reception, and a memory overflow for image reception are checked in steps S107, S108, and S109, respectively, and manual reception or automatic reception in step S110 or S111 is selected. That is, automatic transmission/reception and copying are accepted even during the stand-by mode of the personal radio call.

If the timer circuit is time over, it is checked in step S105 whether a personal radio call is to be performed. If a personal radio call is determined in step S105, a personal radio call is executed again and the count time of 10 minutes is set in the timer circuit in step S106.

Note that a personal radio call is determined in step S105 when the personal radio call switch 12b of the operating unit 12 is turned on, remote transmission is selected in the past in step S8 of FIG. 2, and the memory-received contents corresponding to a personal radio call are not transmitted or the recorded contents are not read out. These checks can be performed by setting flags corresponding to the above conditions.

As described above, according to the sequence shown in FIG. 3, the operation is repeated every 10 minutes until the memory reception contents corresponding to a personal radio call are read out. Therefore, even if a user misses a ringing tone of the personal radio once to several times, information indicating data reception can be reliably given to the user.

In addition, if memory reception is performed a plurality of times, information for identifying a plurality of communications can be transmitted by personal radio control in a personal radio call in the mode 2 in step S15 or S56 of the flow chart shown in FIG. 2.

For example, if a personal radio receiver has a display unit, message codes expressed by DTMF codes can be transmitted and displayed on the display unit of the personal radio. FIG. 4 shows examples of the message codes. Message codes which can be transmitted are, e.g., numerals, -, (,), and a space.

In a personal radio call according to a normal manual operation, if a number of a personal radio is called, a voice message such as "This is a personal radio. Please send a message." is sent back. Therefore, message codes can be transmitted by operating push buttons in accordance with the codes shown in FIG. 4.

Figure 5:
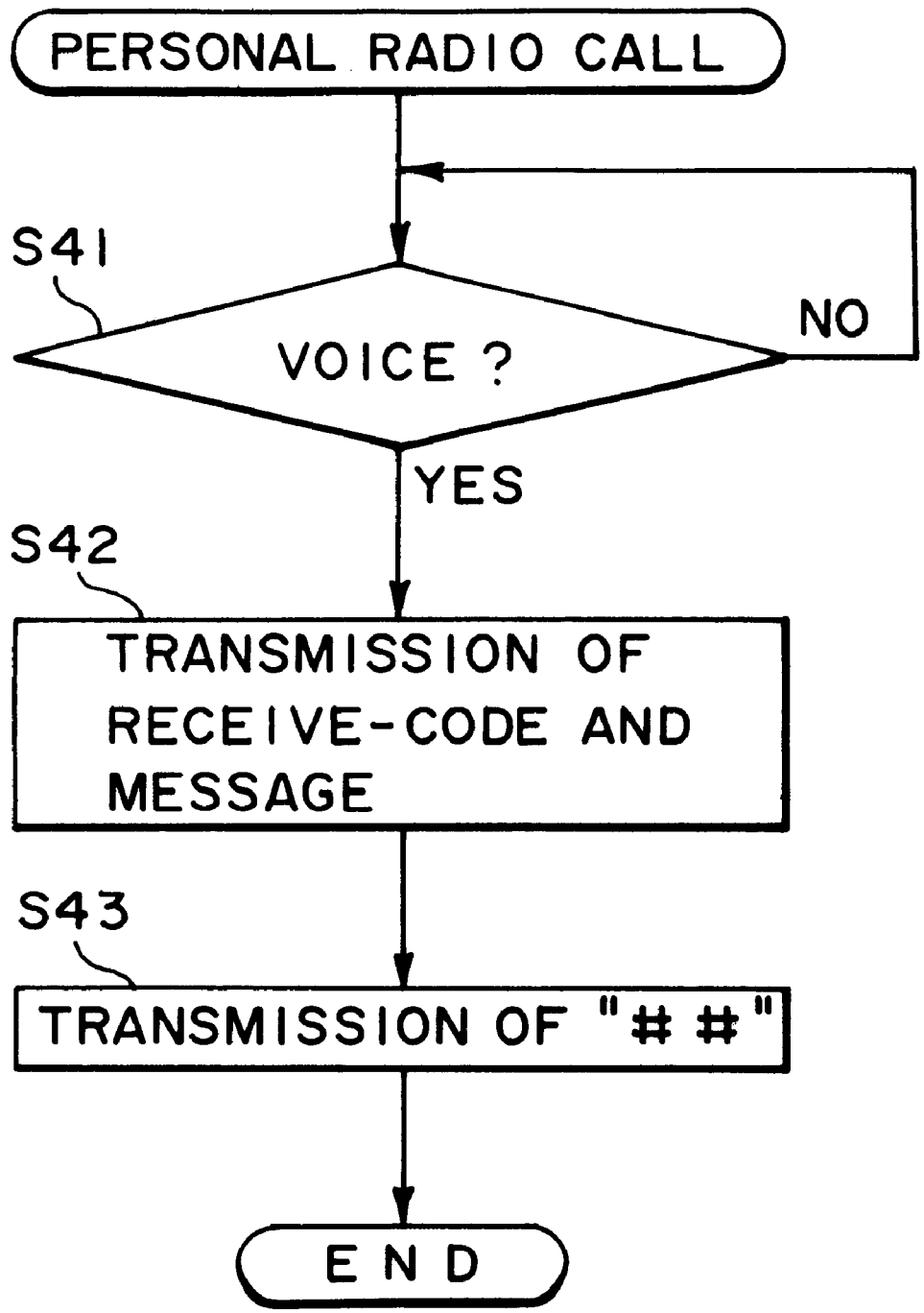
FIG. 5 is a flow chart for explaining a control operation of a personal radio.

Therefore, even in the automatic sequence described above, codes for identifying a plurality of times of memory reception can be transmitted in the same manner as the manual sequence shown in FIG. 5. In this case, a received-code from 0 to 99 is set for each memory reception, and messages from (00) to (99) are transmitted to the personal radio, thereby identifying 0th to 99th memory receptions.

In step S41 shown in FIG. 5, after a telephone number of a predetermined personal radio receiver is called, transmission of a voice message (e.g., "This is a personal radio receiver. Please send a message.") sent back from the personal radio is waited. This voice detection is performed as in step S10 shown in FIG. 2.

In step S42, a received-code set for executed memory reception is transmitted to be displayed with "( )" on the display unit of the personal radio. For example, if the received-code is 00, in order to display (00), dial tones "*400*6" are continuously transmitted in accordance with the codes shown in FIG. 4. Subsequently, in step S43, tones "##" representing the end of the message codes are transmitted to finish the call.

By the personal radio call as described above, identification information from (00) to (99) corresponding to a receive-code can be displayed on a display unit of a personal radio receiver.

A user of the personal radio receiver can identify a plurality of times of memory reception by these receive-codes and can designate image data to be remote-transmitted by transmitting the receive-code in addition to a remote transmission command code by a DTMF code in the remote transmission command in step S7 of FIG. 2.

In remote transmission in step S8, in addition to the above processing, image data corresponding to the received receive-code is transmitted.

In this manner, even if memory reception is executed a plurality of times, each communication can be identified by transmitting a receive-code to a message code of a personal radio receiver. In addition, in the remote transmission control, desired image data can be transmitted by this receive-code.

In the above embodiment, a personal radio receiver has been described. It is a matter of course, however, that a destination for receiving a communication result may be a normal telephone set at a visiting place. In this case, a suitable voice message recorded beforehand is selected and transmitted to identify whether a recorded message is received from a telephone set or a facsimile. Alternatively, a receive-code of memory reception may be transmitted by voice information formed by voice synthesis.

In the above embodiment, a receive-code is transmitted to a personal radio receiver upon facsimile reception. Even in an automatic recording mode, however, a code for identifying a received incoming message may be transmitted to a personal radio receiver or a telephone set.

Note that if a plurality of image data are memory-received as in the above first embodiment and image data in the memory is not output, a memory overflow may occur. Therefore, if information representing that image data is received is given to a user by an automatic call a predetermined number of times and the user does not respond, the received image data in the memory is output and then erased from the memory. In this manner, the memory overflow can be prevented, and a memory reception enable state can always be obtained. Prevention of a memory overflow will be described below as the second embodiment. In the second embodiment, an arrangement of a facsimile apparatus is the same as in FIG. 1, and a control sequence in the stand-by mode differs from that shown in FIG. 3 of the above first embodiment.

Figure 6:
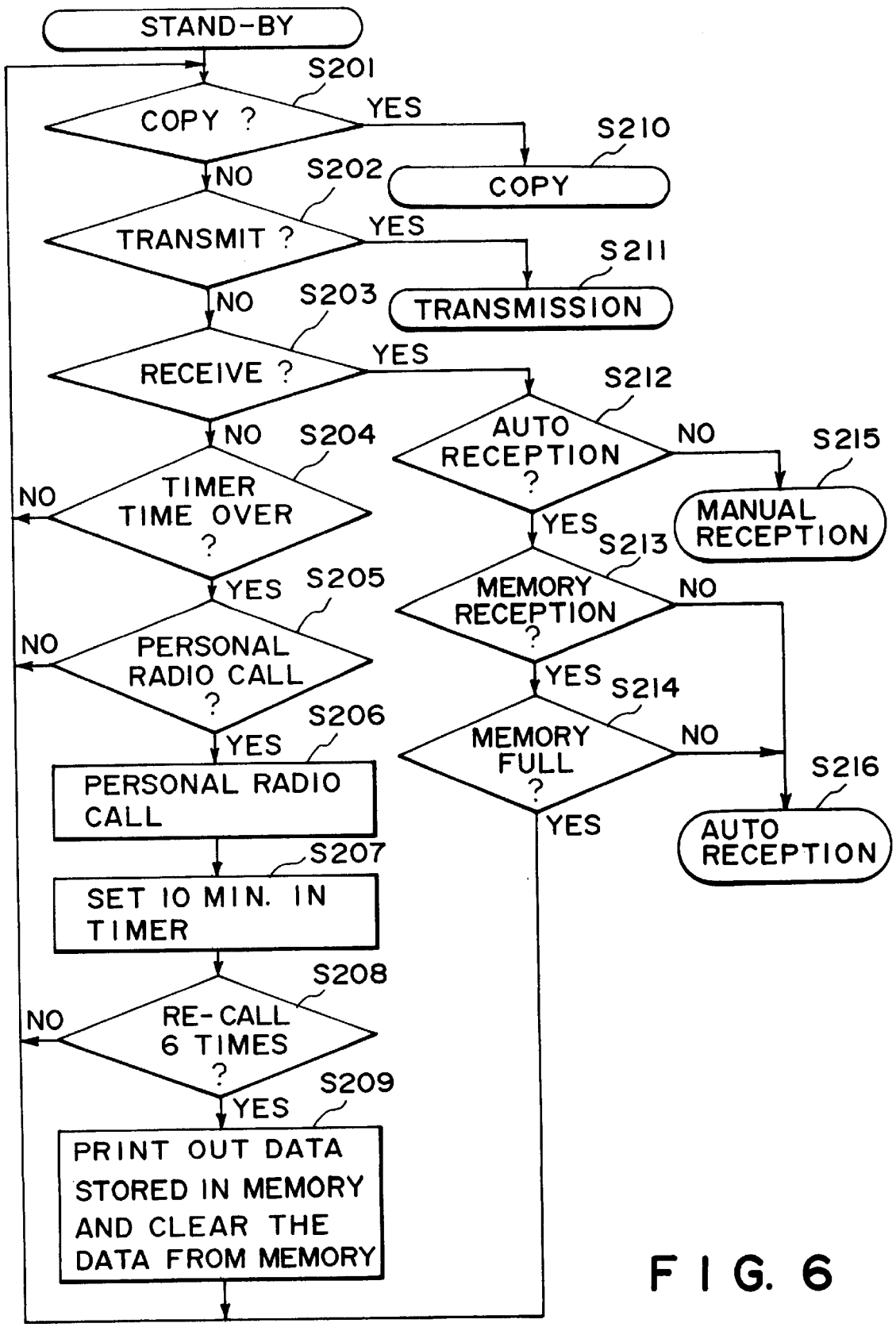
FIG. 6 is a flow chart for explaining a control operation in the stand-by mode according to the second embodiment.

FIG. 6 is a flow chart for explaining a control sequence of a CPU 1 in the stand-by mode according to the second embodiment.

Note that FIG. 6 is a flow chart for explaining a sequence in which after memory reception (S14) shown in FIG. 2 is performed, a FAX personal radio call (S15) is repeatedly performed in the stand-by mode for the next operation, as shown in FIG. 3.

If copying is designated in the stand-by mode (S201), the flow advances to copying (S210). If transmission is designated (S202), the flow advances to transmission (S211). If image data is received (S203) and manual reception is selected (S212), manual reception is performed (S215). If automatic reception is selected (S212), the flow advances to automatic reception (S216). If memory reception is selected (S213), an empty area of an image memory is checked (S214), and then automatic reception is performed by using the memory (S216).

If a timer for a re-call is time over (S204), it is checked in accordance with the state of an operating unit 12 whether a personal radio call is to be performed (S205), and then a FAX personal radio call is executed (S206). A count time of 10 minutes is set again in the re-call timer (S207). It is checked whether the FAX personal radio call is performed six times including the first call (S208). If the call is performed six times, the image data in the image memory is sent to a recorder 6 via a modem 8 and printed out on recording paper, and the print-out image data is cleared from the image memory (S209).

In this embodiment, image data is printed out on recording paper and then cleared from the image memory in step S209. The image data, however, may be cleared not at the print-out timing but upon reception of the next data. In this manner, the image data can be extracted by a user until next reception.

That is, if information representing that image data is received is given to a user by an automatic call a predetermined number of times and the user does not respond, the received image data in the memory is output and then erased from the memory. In this manner, the memory overflow can be prevented, and a memory reception enable state can always be obtained.

In addition, image data stored in the memory by memory reception is automatically printed out on recording paper after a predetermined time elapses even if a user does not extract it. Therefore, since image data is not left in the memory for a long time, a risk of accidental erasure of image data by a power failure or the like can be effectively reduced.

In the flow chart shown in FIG. 2 of the first embodiment, in order to perform a personal radio call in step S15, S19, or S56, a message is sent. Upon message sending, a message is sometimes sent from a personal radio service network. If the sent message collides with the message from the service network, correct message sending cannot be performed. Prevention of a message collision will be described below as the third embodiment.

FIG. 7 is a flow chart for explaining a detailed control sequence of a CPU 1 performed upon personal radio call according to the third embodiment.

When facsimile memory reception or automatic message recording is finished, the CPU 1 automatically calls a telephone number of a personal radio receiver with a display unit registered beforehand in a RAM 4 (step S30). In addition, a timer is started by using a timer area in a RAM 3 (step S31). A voice energy is detected by a modem 8 (step S32). The modem 8 generates a signal representing whether the voice energy on a telephone line 10 is below a predetermined value. As described above, after the display personal radio is called, an announce "This is a personal radio receiver. Please send a message." is supplied from the telephone line 10. This message is sent within two seconds after the call.

Therefore, the CPU 1 measures a time interval, in which the modem 8 generates a signal representing a no-sound state, on a timer area of the RAM 3. If the CPU 1 receives the message via the telephone line 10 within two seconds, it resets the timer (step S33). After the message is ended, if the CPU 1 detects that the no-sound state further continues two seconds (step S34), it outputs a DTMF (dual tone multi-frequency) signal of "*400*8" to the telephone line 10 and causes the personal radio receiver to display "00" in the case of facsimile memory reception. If an absence message is recorded, the CPU 1 outputs a DTMF signal of "1*499*8" and causes the personal radio receiver to display "99". In this manner, the CPU 1 informs a user of the personal radio of whether the received contents are for a facsimile or a telephone set.

As described above, in this embodiment, an energy of the telephone line is detected after a personal radio call is performed. If a no-sound state continues for two seconds, it is determined that a message from the line is ended. After the determination, a message is transmitted from the transmission source. Therefore, a problem in which messages are simultaneously transmitted from the transmission source and destination and the message from the transmission source cannot be correctly recognized at the transmission destination can be solved.

In the above embodiment, energy detection is always performed after automatic calling. If, however, whether energy detection is to be performed can be determined by a user by using a switch, the apparatus can cope with not only a personal radio but also a person. In this case, a message represented by a voice is more effective than that represented by a DTMF signal. That is, facsimile memory reception/automatic message recording is informed by a voice message.

Note that the present invention is not limited to the above embodiments but can be variously modified.

What is claimed is:

1. A data communication apparatus comprising:

detection means for detecting reception of a signal identifying a non-speech terminal equipment;

first receiving means for receiving data of a first type;

second receiving means for receiving data of a second type when said detecting means detects the signal identifying a non-speech terminal equipment, the second type being different from the first type;

first storing means for storing received data of the first type;

second storing means for storing received data of the second type;

manual selection means for selectively pre-setting whether or not a predetermined destination is to be informed of reception of data of the first type and whether or not the predetermined destination is to be informed of reception of data of the second type;

informing means for automatically calling the predetermined destination in response to a preset selection of said manual selection means and reception of data of the first type or data of the second type to inform the destination of the reception of data; and means for receiving a control signal and transmitting received data of the first type stored in said first storing means or received data of the second type stored in said second storing means in accordance with said control signal.

2. An apparatus according to claim 1, wherein the data of the first type is a voice message and the data of the second type is image data.

3. An apparatus according to claim 1, wherein said informing means distinctively informs the destination of the reception of data of the first type and the reception of data of the second type.

4. An apparatus according to claim 1, wherein said informing means repeatedly executes an informing operation until memory-received data is transmitted.

5. A data communication apparatus comprising:

detecting means for detecting reception of a signal identifying a non-speech equipment terminal;

means for receiving data of a first type and for storing the received data;

means for receiving data of a second type when said detecting means detects the reception of the signal identifying a non-speech equipment terminal and for storing the received data;

manual selection means for selectively pre-setting whether or not a predetermined destination is to be informed of reception of data of the first type and whether or not the predetermined destination is to be informed of reception of data of the second type; and informing means for automatically calling a predetermined destination in response to a preset selection of said manual selection means and reception of data of the first type or data of the second type to distinctively inform the destination of the reception of data.

6. An apparatus according to claim 5, further comprising means for receiving a control signal and transmitting received data of the first type or the second type in accordance with said control signal.

7. An apparatus according to claim 5, wherein the data of the first type is a voice message and the data of the second type is image data.

8. An apparatus according to claim 5, wherein said informing means distinctively informs the predetermined destination of the reception of data of the first type and the reception of data of the second type.

9. A data communication apparatus comprising:

memory-receiving means for temporarily storing received data;

informing means for, after receipt is finished, calling a telephone number registered beforehand and informing a user of reception;

transmission control means for transmitting the received data stored in said memory to a predetermined data communication apparatus when a user responds on the basis of the information from said informing means;

informing operation control means for activating and causing said informing means to perform an informing operation at predetermined intervals of time during which the user does not respond to having been informed of reception;

recording means for recording the received data on recording paper when the user does not respond although said informing operation control means repeats the informing operation a predetermined number of times; and erasing means for erasing the received data output by said recording means from said memory at a predetermined time.

10. An apparatus according to claim 1, further comprising:

detecting means for detecting a voice energy on a telephone line; and another detecting means for detecting that the voice energy on said telephone line is in a no-sound state below a predetermined level by using said detecting means, wherein when said another detecting means detects the no-sound state, said informing means outputs a predetermined message signal.

11. A data communication apparatus comprising:

memory-receiving means for temporarily storing received data;

informing means for, after reception is finished, calling a telephone number registered beforehand and informing a user of reception;

transmission control means for transmitting the received data stored in said memory to a predetermined data communication apparatus when a user responds on the basis of the information from said informing means;

informing operation control means for activating and causing said informing means to perform an informing operation at predetermined intervals of time when the user does not respond to having been informed of reception;

recording means for recording the received data on recording paper when the user does not respond although said informing operation control means repeats the informing operation a predetermined number of times;

erasing means for erasing the received data output by said recording means from said memory at a predetermined time;

detecting means for detecting a voice energy on a telephone line; and another detecting means for detecting that the voice energy on said telephone line is in a no-sound state below a predetermined level by using said detecting means, wherein when said another detecting means detects the no-sound state, said informing means outputs a predetermined message signal.

12. An apparatus according to claim 1, wherein said manual selection means has a first selection switch for informing that data of the first type is received, and a second selection switch for informing that data of the second type is received.

13. An apparatus according to claim 5, wherein said manual selection means has a first selection switch for informing that data of the first type is received, and a second selection switch for informing that data of the second type is received.

14. A data communication apparatus comprising:

memory-receiving means for temporarily storing received data;

informing means for, after reception of data is completed, calling a telephone number registered beforehand in said apparatus and informing a user at that telephone number of reception;

transferring means for receiving a control signal and transmitting the received data stored in said memory-receiving means in accordance with the control signal;

recording means for recording the received and stored data on recording paper, when the transmission by said transferring means is not conducted; and erasing means for erasing received data already output by said recording means from said memory-receiving means at a predetermined time.

15. An apparatus according to claim 14, further comprising manual selection means for selecting an information mode for informing that data reception is performed, wherein said informing means executes the information operation when said manual selection means selects the information mode.

16. A data communication method comprising the steps of:

receiving data;

storing the received data into a memory;

after reception is completed, calling a telephone number registered beforehand and informing a user at that telephone number of reception;

receiving a control signal and transmitting the received data stored in the memory in accordance with the control signal;

recording the received data on recording paper; and erasing received data output by said recording step from the memory at a predetermined time when the transmission of the stored data in accordance with the control signal is not conducted, wherein when the transmission of the stored data in accordance with the control signal is not conducted after repeatedly executing said informing step at predetermined times, said recording step is executed to record the stored data on the recording paper.

17. An apparatus according to claim 6, further comprising:

energy detecting means for detecting voice energy on a telephone line; and another detecting means for detecting that the voice energy on the telephone line is in a no-sound state below a predetermined level by using said detecting means, wherein when said another detecting means detects the no-sound state, said informing means outputs a predetermined message signal.

18. A data communication method comprising the steps of:

detecting reception of a signal identifying a non-speech terminal equipment;

receiving data of a first type;

receiving data of a second type when said detecting step detects the signal identifying a non-speech terminal equipment, said second type being different from the first type;

storing received data of the first type;

storing received data of the second type;

selectively and manually pre-setting whether or not a predetermined destination is to be informed of reception of data of the first type and whether or not the predetermined destination is to be informed of reception of data of the second type;

automatically calling the predetermined destination in response to pre-setting in said pre-setting step and reception of data of the first type or data of the second type to inform the destination of the reception of the data; and receiving a control signal and transmitting received data of the first type or received data of the second type, stored in said storing step, in accordance with the control signal.

19. A method according to claim 18, wherein the data of the first type is a voice message and the data of the second type is image data.

20. A method according to claim 18, wherein said automatically calling step distinctively informs the predetermined destination of the reception of data of the first type and the reception of data of the second type.

21. A method according to claim 18, wherein said automatically calling step repeatedly executes an informing operation until memory-received data is transmitted.

22. A data communication method comprising the steps of:

detecting reception of a signal identifying a non-speech equipment terminal;

receiving data of a first type and storing the received data;

receiving data of a second type when said detecting step detects the reception of the signal identifying a non-speech equipment terminal and storing the received data;

manually and selectively pre-setting whether or not a predetermined destination is to be informed of reception of data of the first type and whether or not the predetermined destination is to be informed of reception of data of the second type; and automatically calling the predetermined destination in response to pre-setting in said pre-setting step and reception of data of the first type or data of the second type to distinctively inform the destination of the reception of the data.

23. A method according to claim 22, further comprising the step of receiving a control signal and transmitting received data of the first type or the second type in accordance with the control signal.

24. A method according to claim 22, wherein the data of the first type is a voice message and the data of the second type is image data.

25. A method according to claim 22, wherein said automatically calling step distinctively informs the predetermined destination of the reception of the reception of data of the first type and the reception of data of the second type.

26. A data communication method comprising the steps of:

temporarily storing received data;

after receipt is finished, calling a telephone number registered beforehand and informing a user of reception;

transmitting the received data stored in said temporarily storing step to a predetermined data communication apparatus when a user responds on the basis of information provided to the user in said calling and informing step;

causing performance of said calling and informing step to perform an informing operation every predetermined time when the user does not respond;

recording the received data on recording paper when the user does not respond although said causing step repeats the informing operation a predetermined number of times; and erasing from memory the received data output in said recording step at a predetermined timing.

27. A method according to claim 18, further comprising the steps of:

detecting voice energy on a telephone line; and detecting that the voice energy on the telephone line is in a no-sound state below a predetermined level, by using a detecting means also used in performing the first-mentioned detecting step, wherein, when the second-mentioned detecting step detects the no-sound state, said automatically calling step includes outputting of a predetermined message signal.

28. A method according to claim 18, wherein said pre-setting step is performed using a first selection switch for informing that data of the first type is received, and a second selection switch for informing that data of the second type is received.

29. A method according to claim 22, wherein said pre-setting step is performed using a first selection switch for informing that data of the first type is received, and a second selection switch for informing that data of the second type is received.

30. A data communication method comprising the steps of:

temporarily storing received data;

after reception of data is completed, calling a telephone number registered beforehand and informing a user at the telephone number of reception;

receiving a control signal and transmitting the received data stored in said storing step means in accordance with the control signal;

recording the stored data on recording paper, when the transmission in said receiving and transmitting step is not conducted; and erasing received data already output in said recording step from memory at a predetermined timing.

31. A method according to claim 30, further comprising the step of manually selecting an information mode for informing that data reception is performed, wherein said data informing includes executing the information operation when the information mode is selected.

32. A method according to claim 22, further comprising:

detecting voice energy on a telephone line; and detecting that the voice energy on the telephone line is in a no-sound state below a predetermined level by using a detecting means also used in the first-mentioned detecting step, wherein when the second mentioned said detecting step detects the no-sound state, a predetermined message signal is output.

33. A data communication method comprising the steps of:

temporarily storing received data in a memory;

after reception is finished, calling a telephone number registered beforehand and informing a user of reception;

transmitting the received data stored in the memory to a predetermined data communication apparatus when a user responds on the basis of the information from said informing step;

activating and causing said informing step to perform an informing operation at predetermined intervals of time when the user does not respond to having been informed of reception;

recording the received data on recording paper when the user does not respond although said activating and causing step causes said informing step to repeat the informing operation a predetermined number of times;

erasing means for erasing the received data output by said recording step from the memory at a predetermined time;

detecting a voice energy on a telephone line using a detecting means; and detecting that the voice energy on the telephone line is in a no-sound state below a predetermined level by using the detecting means, wherein when said second-mentioned detecting step detects the no-sound state, said informing step outputs a predetermined message signal.

* * * * *

UNITED STATES PATENT AND TRADEMARK OFFICE
CERTIFICATE OF CORRECTION

PATENT NO. : 5,953,391

DATED : September 14, 1999

INVENTOR(S) : TOSHIO KENMOCHI

It is certified that error appears in the above-identified patent and that said Letters Patent is hereby corrected as shown below:

Title page, item

[56] REFERENCES CITED

U.S. Patent Documents
Insert: --4,932,048 12/89 Kenmochi et al."--.

COLUMN 1

Line 5, "continuation," should read --continuation--.

Line 54, "1990" should read --1990,--.

Line 59, "1990" should read --1990,--.

COLUMN 12

Line 40, "time" should read --time,--.

UNITED STATES PATENT AND TRADEMARK OFFICE
CERTIFICATE OF CORRECTION

PATENT NO. : 5,953,391

DATED : September 14, 1999

INVENTOR(S) : TOSHIO KENMOCHI

It is certified that error appears in the above-identified patent and that said Letters Patent is hereby corrected as shown below:

COLUMN 13

Line 58, "the reception of" (second occurrence) should be deleted.

Signed and Sealed this

Fifth Day of December, 2000

Attest:

Q. TODD DICKINSON

Attesting Officer       Director of Patents and Trademarks

UNITED STATES PATENT AND TRADEMARK OFFICE
CERTIFICATE OF CORRECTION

PATENT NO. : 5,953,391
DATED : September 14, 1999
INVENTOR(S) : Toshio Kenmochi

Page 1 of 1

It is certified that error appears in the above-identified patent and that said Letters Patent is hereby corrected as shown below:

Item [56] References Cited,
U.S. PATENT DOCUMENTS
Insert: -- 4,932,048  12/89  Kenmochi et al. --

Signed and Sealed this

Eighteenth Day of December, 2001

Attest:

JAMES E. ROGAN
*Attesting Officer*     *Director of the United States Patent and Trademark Office*